United States Patent [19]
Yanagisawa et al.

[11] Patent Number: 5,801,906
[45] Date of Patent: Sep. 1, 1998

[54] MAGNETIC HEAD DEVICE INCORPORATING A FERROELECTRIC THIN FILM

[75] Inventors: Masahiro Yanagisawa; Akinobu Sato; Ken Ajiki, all of Tokyo, Japan

[73] Assignee: NEC Corporation, Tokyo, Japan

[21] Appl. No.: 764,459

[22] Filed: Dec. 12, 1996

[30] Foreign Application Priority Data

Dec. 13, 1995 [JP] Japan ................... 7-324264

[51] Int. Cl.$^6$ ........................................ G11B 5/48
[52] U.S. Cl. ............................................. 360/104
[58] Field of Search ............................ 360/103–104, 360/105–106

[56] References Cited

U.S. PATENT DOCUMENTS 5,276,573  1/1994  Harada ..................... 360/103

FOREIGN PATENT DOCUMENTS 1-185888  7/1989  Japan .

OTHER PUBLICATIONS

H. Hamilton, "Contact Recording on Perpendicular Rigid Media", Journal of the Magnetics Society of Japan, vol. 15 Supplement, No. S2 (1991), pp. 483–490.

*Primary Examiner*—A. J. Heinz
*Attorney, Agent, or Firm*—Ostrolenk, Faber, Gerb & Soffen, LLP

[57] ABSTRACT

A ferroelectric thin film (6) is formed on the surface of a support spring (4) for pressing a magnetic head (3) against a magnetic disc (1) so that the magnetic head (3) is in close contact with the magnetic disc (1). When the magnetic head (3) jumps out of the magnetic disc (1), electrostatic attractive force acts between the ferroelectric thin film (6) and the magnetic disc (1) to prevent the jumping of the magnetic head (3). Further, when the magnetic head (3) is excessively pressed against the magnetic disc (1), electrostatic repulsive force acts between the ferroelectric thin film (6) and the magnetic disc (1) to prevent the pressing force from increasing, thereby preventing the magnetic head (3) and the magnetic recording surface of the magnetic disc (1) from being worn or scratched.

12 Claims, 3 Drawing Sheets

MAGNETIC HEAD DEVICE INCORPORATING A FERROELECTRIC THIN FILM

BACKGROUND OF THE INVENTION

1. Field of the Invention

The present invention relates to a magnetic recording device which is used in a peripheral storage device for a computer or the like, and particularly to a magnetic head device for reading/writing information from/in a magnetic recording medium such as a magnetic disc or the like.

2. Description of the Related Art

Recently, it has been required more and more to enhance the recording density in a field for information recording files, and magnetic recording media each having a magnetic recording layer on a substrate, particularly magnetic discs obtained by forming magnetic recording media in a disc shape have been frequently used. In order to enhance the recording density in this type of magnetic disc, it is required to reduce the interval between a magnetic head for reading/writing information to reproduce/record the information from /on a recording medium and the surface of a magnetic recording layer of the recording medium on which the information is held, that is, to reduce the spacing. By reducing the spacing, the recording density in a track which is a train of information stored in a circumferential direction of the magnetic disc, that is, the line storage density which is the recording density per track or per unit length can be increased. Further, the recording density in a radial direction, that is, the track density which is the number of tracks per unit length in the radial direction can be increased.

In order to reduce the spacing and keep the spacing stably, a magnetic head device using levitation force has been hitherto proposed. However, this device needs a gap through which levitation force of air is produced, and this obstructs the reduction level of the spacing. Therefore, in place of this type magnetic head device has been proposed a contact type magnetic head device in which the magnetic head and the magnetic recording medium are directly brought into contact with each other without using the levitation force of air. This contact type magnetic head device is disclosed by H. Hamilton: Journal of the Magnetics Society of Japan, Vol. 15, Supplement No. S2 (1991) 483–490. In this magnetic head device, there exists no gap between the magnetic head and the surface of the magnetic recording medium, so that the spacing can be reduced. Therefore, it is effective to enhance the recording density.

According to the conventional contact type magnetic head device as described above, since the magnetic head is brought into contact with the surface of the magnetic recording medium, the magnetic head must be pressed against the magnetic recording medium under some degree of force to keep the magnetic head and the magnetic recording medium in contact with each other. Accordingly, there occurs some contact friction between the magnetic head and the magnetic recording medium due to the pressing force, resulting in wearing of the surface of the magnetic recording medium.

Furthermore, the magnetic recording medium is moved at high speed relatively to the magnetic head. Therefore, when some unevenness exists on the surface of the magnetic recording medium, the magnetic head which is brought into contact with the surface of the magnetic recording medium jumps out at a projecting portion on the surface and goes out away from the surface of the magnetic recording medium due to the inertia force thereof, so that it is finally impossible to keep the fine spacing between the magnetic head and the surface of the magnetic recording medium. Furthermore, at a recess portion on the surface of the magnetic recording medium, the inertia force is applied to the magnetic head in the opposite direction, so that the abrasion of the magnetic recording medium is promoted or the magnetic recording medium is scratched.

In order to avoid these problems, Japanese Patent Application Laid-open No. 1-185888 proposed a technique in which a piezoelectric member is secured to a portion of a support spring for a magnetic head, and the other portion of the support spring is pushed by the piezoelectric member to press the magnetic head against the surface of the magnetic recording medium. This technique is effective to prevent the jumping of the magnetic head as described above, however, it is not effective to prevent the abrasion of the surface of the magnetic recording medium. Further, in the case where the piezoelectric member is provided as described above, the magnetic head device must be designed in a large size, and also it must be designed in a complicated structure because it needs wires for supplying current to the piezoelectric member.

SUMMARY OF THE INVENTION

An object of the present invention is to provide a magnetic head device in which a magnetic head can be brought into contact with a magnetic recording medium under appropriate force at all times to keep a stable fine spacing between the magnetic head and the surface of the magnetic recording medium, and suppress the abrasion of the surface of the magnetic recording medium.

In order to attain the above object, according to the present invention, a magnetic head device comprises a magnetic head which is relatively shifted in close contact with a magnetic recording medium to read/write information from/on the magnetic recording medium, a support spring for pressing the magnetic head against the magnetic recording medium, and a ferroelectric thin film which is deformed in connection with the bending of the support spring and electro-statically charged when it is deformed. That is, according to the present invention, when the magnetic head jumps out from the magnetic recording medium, electrostatic attractive force acts between the ferroelectric thin film and the magnetic recording medium while when the magnetic head is excessively pressed against the magnetic recording medium, electrostatic repulsive force acts between the ferroelectric thin film and the magnetic recording medium.

For example, in the magnetic head device of the present invention, the support spring comprises a leaf spring which is elastically deformed vertically to the surface of the magnetic recording medium. The magnetic head is pressed against the magnetic recording medium by the elastic force acting in the thickness direction of the leaf spring. The ferroelectric thin film is formed over the surface of a side of the leaf spring which confronts the magnetic recording medium. The surface of the magnetic recording medium is negatively charged. The ferroelectric thin film is positively charged when the magnetic head is located at a projecting portion on the surface of the magnetic recording medium, so that the attractive force is produced between the magnetic head and the magnetic recording medium. On the other hand, when the magnetic head is located at a recess portion on the surface of the magnetic recording medium, the ferroelectric thin film is negatively charged, so that the repulsive force is produced between the magnetic head and the magnetic recording medium. The polarity may be reversed.

According to the present invention, when the magnetic head is about to jump out from the magnetic recording medium (the magnetic head is located at a projecting portion on the magnetic recording medium), the electrostatic attractive force acts between the ferroelectric thin film and the magnetic recording medium. On the other hand, when the magnetic head is about to be excessively strongly pressed against the magnetic recording medium (when the magnetic head is located at a recess portion on the magnetic recording medium), the electrostatic repulsive force acts between the ferroelectric thin film and the magnetic recording medium. Therefore, the magnetic head can be prevented from jumping out of the magnetic recording medium to keep the fine spacing, thereby achieving a high recording density. Further, the increase of the pressure force of the magnetic head against the magnetic recording medium can be prevented, and the abrasion of the surfaces of the magnetic head and the magnetic recording medium and the occurrence of scratches on the surfaces can be prevented. The present invention may be applied by directly using existing magnetic head and magnetic disc and forming the ferroelectric thin film and the protection layer on the magnetic head and the magnetic disc respectively. Therefore, according to the present invention, the construction of the magnetic head device can be simplified, and also can be miniaturized.

DETAILED DESCRIPTION OF THE PREFERRED EMBODIMENT

Figure 1:
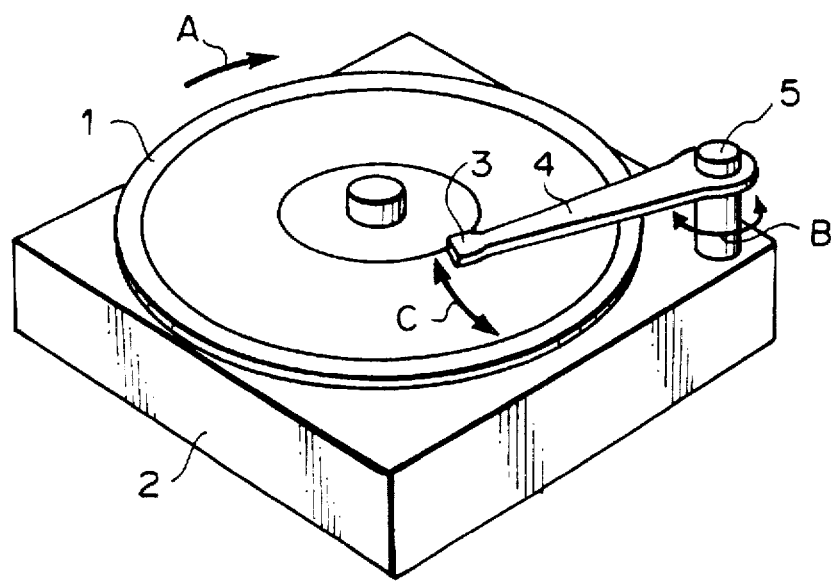
FIG. 1 is a perspective view showing the whole construction of an embodiment according to the present invention.
Figure 2:
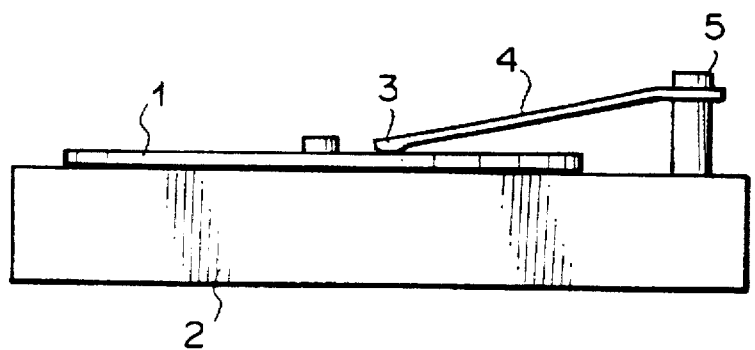
FIG. 2 is a side view of FIG. 1.
Figure 3:
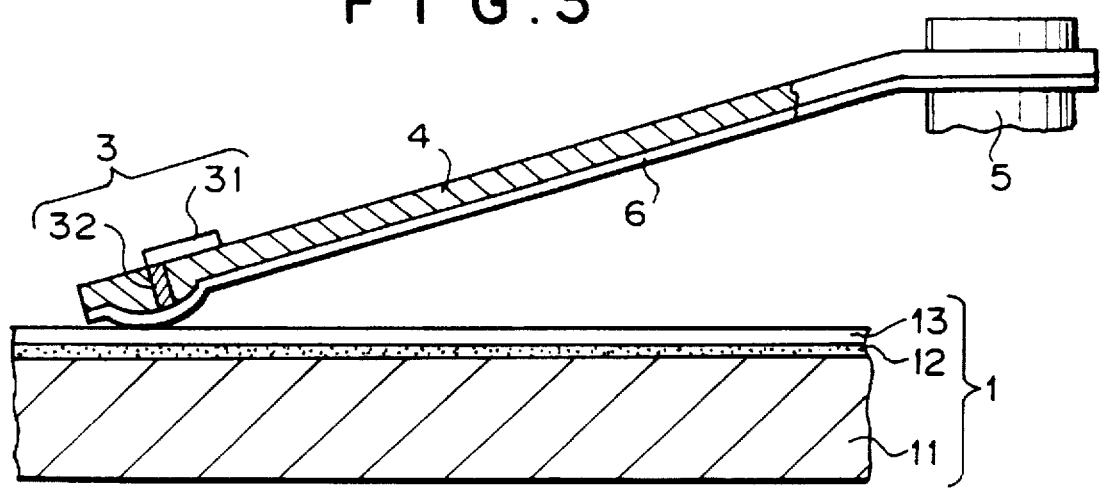
FIG. 3 is an enlarged view of a main part of the embodiment.

FIG. 1 is a perspective view showing the construction of a magnetic head device according to the present invention, FIG. 2 is a side view of FIG. 1, and FIG. 3 is an enlarged view of a main part of the magnetic head device. In the following description, a magnetic disc is used as a magnetic recording medium.

The magnetic disc 1 is obtained by forming a magnetic recording layer 12, a protection layer 13, etc. on the surface of a disc-shaped substrate 11 in a well-known manner. In this embodiment, a hydrogenated carbon film is formed at a thickness of 10 nm as the protection layer on the surface of the magnetic recording medium. The center portion of the magnetic disc 1 is supported by a rotational shaft of a rotation driving apparatus 2, and the magnetic disc 1 is rotated at high speed as indicated by an arrow A. The magnetic head 3 is disposed to confront the surface of the magnetic disc 1 to be brought into contact with the surface of the protection layer. The magnetic head 3 is secured to the tip of a support spring 4 serving as an arm, and the base end of the support spring 4 is rotatable around the direction perpendicular to the surface of the magnetic disc 1 by a scanning device 5, whereby the magnetic head 3 is swingably moved in a substantially radial direction as indicated by an arrow C relatively to the surface of the magnetic disc 1, thereby performing the scanning operation of the magnetic head on the magnetic recording layer.

As shown in FIG. 3, the support spring 4 comprises a slender leaf spring which is formed of a metal member having elasticity, and the magnetic head 3 is pressed against the surface of the magnetic disc 1 under appropriate pressure by the elastic force of the support spring 4 in the thickness direction. In this embodiment, the support spring 4 is formed of stainless steel which is 20 micrometers in thickness, 0.5 mm in width and 10 mm in length, and the magnetic head 3 is pressed against the magnetic disc 1 at a weight of 100 mg. A magnetic head which has been hitherto used is directly usable as the magnetic head 3. In FIG. 3, a write-in/reproducing device 31 and a magnetic circuit 32 connected to the device 31 are illustrated.

A ferroelectric thin film 6 of ferroelectric material is formed over the surface of the magnetic head 3 and the surface of the support spring 4 at the side thereof which confronts the magnetic disc 1. As the ferroelectric thin film 6, for example, zirconium titanate may be formed at a thickness of 0.5 micrometers by a sputtering method. The support spring 4 is disposed so as to cross the magnetic recording surface of the magnetic disc 1 at a predetermined angle. The location of the support spring 4 at this predetermined angle is set as a balanced position, and the magnetic head device of this embodiment is designed so that the magnetic head 3 is pressed against the surface of the magnetic disc 1 under the appropriate pressure at the balanced position. in this state, no polarization occurs in the ferroelectric thin film 6.

In the magnetic head device thus constructed, even when some degree of unevenness occurs on the surface of the magnetic recording layer of the magnetic disc 1, the magnetic head 3 is brought into close contact with the magnetic recording surface of the magnetic disc 1 by the pressing force of the support spring 4, whereby the fine spacing state is kept. However, when the degree of the unevenness on the magnetic recording surface of the magnetic disc is large, the magnetic head 3 is upwardly and downwardly moved in accordance with the unevenness to induce inertia force to the magnetic head 3. Accordingly, the magnetic head 3 may jump at a projecting portion of the magnetic recording surface due to the inertia force, and the magnetic head 3 may abut against the recording surface at a recess portion due to the inertia force, so that the magnetic head 3 is pressed against the magnetic recording surface by stronger force.

Figure 4A:
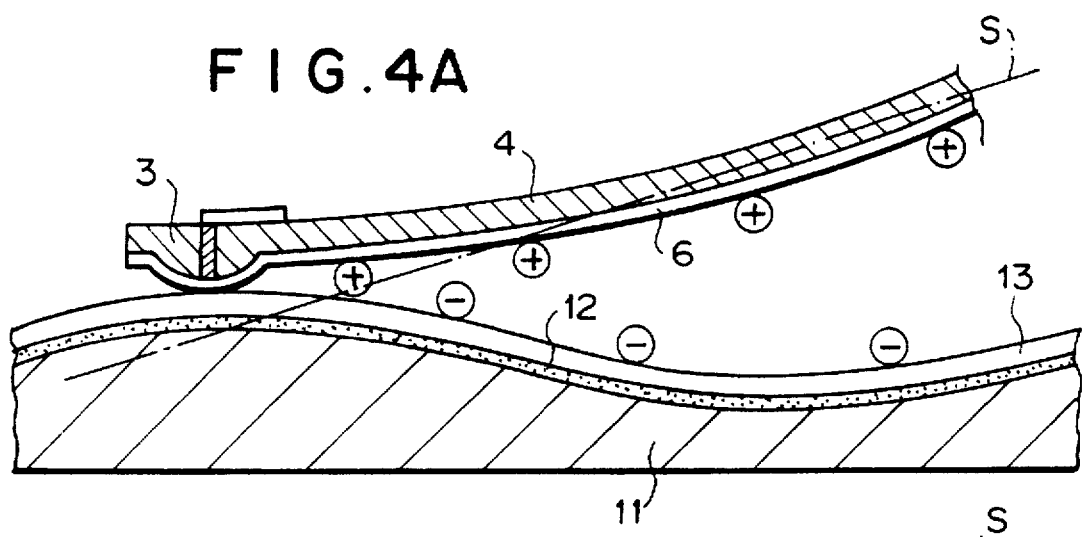
FIGS. 4A and 4B are each cross-sectional view showing the main part to explain the action of the present invention.

However, according to the magnetic head device of this embodiment, as shown in FIG. 4A, when the magnetic head 3 is located at a projecting portion on the magnetic recording surface of the magnetic disc, the magnetic head 3 is located above the balanced position (reference position) S, and the support spring 4 is upwardly bent (downwardly projected). Therefore, the ferroelectric thin film 6 is deformed and polarized, so that it is positively charged on the lower side surface thereof, that is, the surface of the ferroelectric thin film 6 which confronts the magnetic disc 1. The surface of the magnetic disc 1 is coated with the protection film 13 which is formed of hydrogenated carbon and has a large resistivity, and thus the surface of the magnetic disc 1 is negatively charged. Accordingly, attractive force is produced between the ferroelectric thin film 6 and the recording surface of the magnetic disc 1 by the positive and negative charges on the ferroelectric thin film 6 and the magnetic recording surface. Therefore, the inertia force promoting the magnetic head 3 to move away from the magnetic disc 1 is offset by the attractive force, thereby preventing the magnetic head 3 from jumping out of the recording surface of the magnetic disc 1. Accordingly, the increase of the spacing at the projecting portion of the magnetic disc 1 can be prevented, and the fine spacing state can be kept.

Figure 4B:
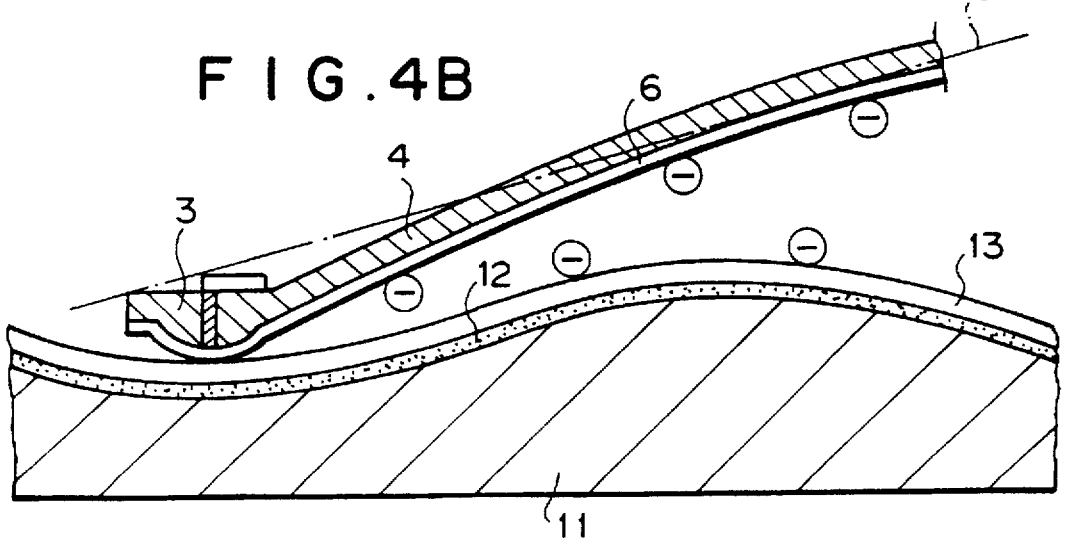

On the other hand, as shown in FIG. 4B, when the magnetic head 3 is located at a recess portion of the magnetic disc, the magnetic head is located below the balanced position S and the support spring 4 is downwardly bent (upwardly projected). Accordingly, the ferroelectric thin film 6 is deformed and polarized, so that it is negatively charged on the lower side surface thereof, that is, the surface of the ferroelectric thin film 6 which confronts the magnetic disc 1. In addition, as described above, the protection film 13 on the recording surface is negatively charged, so that the repulsive force is produced between the ferroelectric thin film 6 and the recording surface of the magnetic disc 1 by the negative charges thereof. Therefore, the inertia force promoting the magnetic head 3 to approach to the magnetic disc 1 is offset by the repulsive force, thereby preventing the magnetic head 3 from being strongly pressed against the recording surface of the magnetic disc 1. Therefore, the abrasion of the recording surface of the magnetic disc 1 due to the excessive press of the magnetic head 3 at the recess portion of the magnetic disc 1 can be prevented from progressing.

The following is an experimental comparison test between the magnetic head device according to this embodiment and a conventional magnetic head device (comparative example) in which no ferroelectric thin film is formed on the magnetic head and the support spring and no protection layer of hydrogenated carbon film is formed on the surface of the magnetic disc. The magnetic disc was rotated at 3600 rpm, and the abrasion of the magnetic head and the magnetic disc after 1000 hours was measured by a surface roughness tester. At the same time, the jump amount of the magnetic head was measured by an interferometer. As a result, in the case of the magnetic head device of this embodiment, the abrasion of each of the magnetic head and the magnetic disc was little observed. On the other hand, in the case of the conventional magnetic head device, abrasion of 0.1 micrometer occurred in a contact portion of the magnetic head with the magnetic disc, and scratches were observed on the surface of the magnetic disc. Further, in the conventional magnetic head device, 50 nm jump at maximum from the surface of the magnetic disc was observed for the magnetic head. In the magnetic head device of this embodiment, 1 nm jump at maximum was observed.

The ferroelectric thin film of the present invention is not limited to that used in the above-described embodiment, and various types may be used. Particularly, there may be used a ferroelectric thin film which is polarized and charged with the opposite polarity to the ferroelectric material used in the above-described embodiment when it is bent in the same direction. In this case, a protection material which is charged with the opposite polarity to the material used in the above-described embodiment may be used as the protection layer on the magnetic disc. The thickness, etc. of the ferroelectric thin film may be suitably altered in accordance with the pressing force of the magnetic head, the mass (weight) of the magnetic head, etc.

Figure 5:
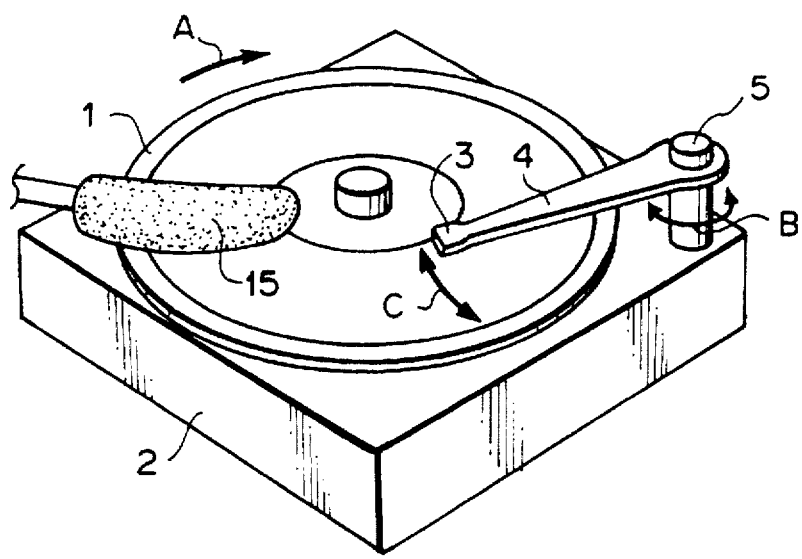
FIG. 5 is a perspective view showing the whole construction of an embodiment according to the present invention.
Figure 6A:
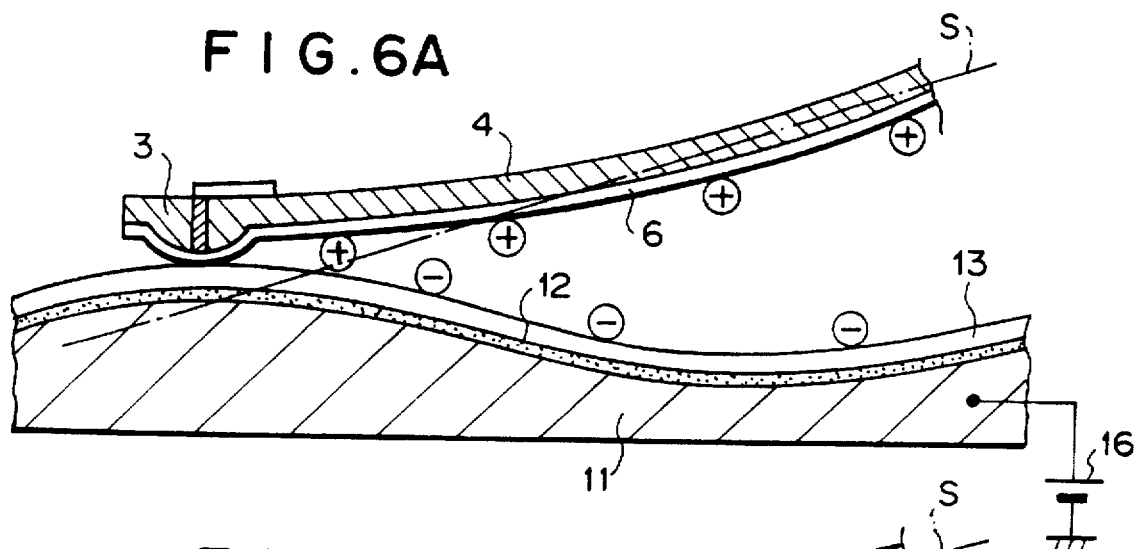
FIGS. 6A and 6B are each cross-sectional view showing the main part to explain the action of the present invention.
Figure 6B:
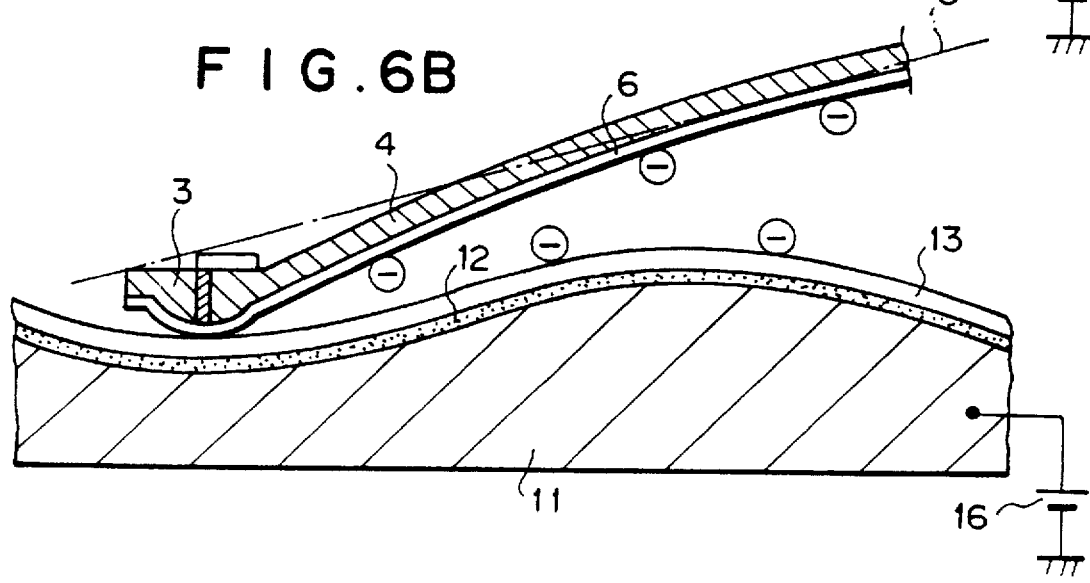

Means for charging the surface of the magnetic disc 1 in appropriate polarity may be employed. For example, as shown in FIG. 5, rubbing member 15 can be used for charging the surface of the magnetic disc 1 by frictional electricity. The rubbing member 15 also acts as a cleaning member for the surface of the magnetic disc 1. If the substrate 11 of the magnetic disc 1 is made of an electrically conductive material such as metal, e.g. aluminum, as shown in FIGs. 6A and 6B, a voltaic cell 16 electrically connected to the substrate 11 can be used for charging the surface of the magnetic disc 1. If the substrate 11 of the magnetic disc 1 is made of an insulating material such as glass, a voltaic cell electrically connected to the magnetic recording layer 12 at an inner or outer peripheral portion of the magnetic disc 1 can be used for charging the surface of the magnetic disc 1.

What is claimed is:

1. A magnetic head device comprising:
   a magnetic head which is relatively shifted in close contact with the surface of a magnetic recording medium to read/write information from/on the magnetic recording medium;
   a support spring for pressing said magnetic head against the surface of the magnetic recording medium; and
   a ferroelectric thin film coupled to the magnetic head and coupled to the support spring, the ferroelectric thin film being deformed in connection with deformation of said support spring from a reference state, said deformation electrostatically charging said ferroelectric thin film.

2. The magnetic head device as claimed in claim 1, wherein said ferroelectric thin film is electrostatically charged so that when said support spring is deformed from the reference state in a first direction, attractive force acts between said ferroelectric thin film and the magnetic recording medium while when said support spring is deformed from the reference state in a second direction which is opposite to the first direction, repulsive force acts between said ferroelectric thin film and the magnetic recording medium.

3. The magnetic head device as claimed in claim 2, wherein the first direction corresponds to a direction in which said magnetic head is moved away from the surface of the magnetic recording medium, and the second direction corresponds to a direction in which said magnetic head approaches to the surface of the magnetic recording medium.

4. The magnetic head device as claimed in claim 1, wherein said ferroelectric thin film is electrostatically charged so that when said magnetic head jumps out of the magnetic recording medium, attractive force acts between said ferroelectric thin film and the magnetic recording medium while when said magnetic head is excessively pressed against the magnetic recording medium, repulsive force acts between said ferroelectric thin film and the magnetic recording medium.

5. The magnetic head device as claimed in claim 1, wherein said ferroelectric thin film is electrostatically charged so that when said magnetic head is in close contact with a projecting portion on the surface of the magnetic recording medium, attractive force acts between said ferroelectric thin film and the magnetic recording medium while when said magnetic head is in close contact with a recess portion on the surface of the magnetic recording medium, repulsive force acts between said ferroelectric thin film and the magnetic recording medium.

6. The magnetic head device as claimed in claim 5, wherein the surface of the magnetic recording medium is negatively charged, and said ferroelectric thin film is positively charged when said magnetic head is brought into close contact with the projecting portion on the surface of the magnetic recording medium while said ferroelectric thin film is negatively charged when said magnetic head is brought into close contact with the recess portion on the surface of the magnetic recording medium.

7. The magnetic head device as claimed in claim 1, wherein said magnetic head is secured to one end of said support spring, and the other end of said support spring is held by a scanning device, said scanning device being adapted to rotate said support spring while pressing said magnetic head against the surface of the magnetic recording medium.

8. The magnetic head device as claimed in claim 1, wherein said support spring is formed of a leaf spring which is elastically deformed in a direction which crosses the surface of the magnetic recording medium, and said ferroelectric thin film is integrally formed on the surface of said leaf spring which confronts the magnetic recording medium.

9. The magnetic head device as claimed in claim 1, wherein said magnetic head is secured to one end of said support spring, and the other end of said support spring is held by a scanning device, said scanning device being adapted to rotate said support spring while pressing said magnetic head against the surface of the magnetic recording medium, wherein said support spring is formed of a leaf spring which is elastically deformed in a direction which crosses the surface of the magnetic recording medium, and said ferroelectric thin film is integrally formed on the surface of said leaf spring which confronts the magnetic recording medium.

10. The magnetic head device as claimed in claim 1, wherein said ferroelectric thin film is made of zirconium titanate, and hydrogenated carbon film is coated on the surface of the magnetic recording medium.

11. The magnetic head device as claimed in claim 1, wherein the magnetic recording medium is a magnetic disc.

12. The magnetic head device as claimed in claim 1, further comprising means for electrostatically charging the surface of said magnetic recording medium.

* * * * *